United States Patent
Weibel

(10) Patent No.: US 6,861,081 B2
(45) Date of Patent: Mar. 1, 2005

(54) METHOD FOR MAKING REDUCED CALORIE CULTURED CHEESE PRODUCTS

(75) Inventor: Michael K. Weibel, 120 Gallows Hill Rd., West Redding, CT (US) 06896

(73) Assignee: Michael K. Weibel, Redding, CT (US)

( * ) Notice: Subject to any disclaimer, the term of this patent is extended or adjusted under 35 U.S.C. 154(b) by 71 days.

(21) Appl. No.: 10/322,155

(22) Filed: Dec. 18, 2002

(65) Prior Publication Data

US 2003/0124238 A1 Jul. 3, 2003

Related U.S. Application Data

(63) Continuation of application No. 10/016,462, filed on Nov. 2, 2001, now abandoned, which is a continuation of application No. 09/424,375, filed as application No. PCT/US98/10803 on May 28, 1998, now abandoned.
(60) Provisional application No. 60/047,903, filed on May 29, 1997.

(51) Int. Cl.$^7$ .......................... A23L 1/534; A23L 20/00
(52) U.S. Cl. .............................. 426/36; 426/40; 426/42; 426/43; 426/519; 426/573; 426/582; 426/585
(58) Field of Search .............................. 429/36, 40, 42, 429/43, 519, 573, 582, 585

(56) References Cited

U.S. PATENT DOCUMENTS 6,025,007 A * 2/2000 Krawczyk .................... 426/573

* cited by examiner

Primary Examiner—Helen Pratt
(74) Attorney, Agent, or Firm—Dann, Dorfman, Herrell & Skillman, P.C.

(57) ABSTRACT

A method is disclosed for making reduced calorie cultured cheeses whereby the natural lipid content of milk is replaced with colloidal forms of synthetic or chemically structured lipids displaying low to no human digestibility. The colloidal dispersion of modified lipids contained within the milk base is initially stabilized by preferred combinations of polymeric and particulate hydrocolloidal materials such as structurally expanded cellulose. Such stabilization is important during formation of the curd to ensure homogeneous distribution and maintenance of the lipid dispersion throughout the coagulum yet allow effective concentration of the coagulum solids by means of ordinary water removal methods commonly used in the manufacture of conventional cultured cheeses. The coagulum is then processed by means similar to that employed for naturally fermented cheeses. The resulting cultured cheese is a reduced calorie product with low to no metabolizable fat content yet possesses organoleptic properties similar to a full fat product.

9 Claims, No Drawings

`US 6,861,081 B2`

METHOD FOR MAKING REDUCED CALORIE CULTURED CHEESE PRODUCTS

The present application is a Continuation of U.S. patent application Ser. No. 10/016,462, filed Nov. 2, 2001, now abandoned, which is a Continuation of U.S. patent application Ser. No. 09/424,375, filed Nov. 23, 1999, now abandoned, which is the National Stage of International Application No. PCT/US98/10803, filed May 28, 1998, which claims the benefit of U.S. Provisional Application No. 60/047,903, filed May 29, 1997.

BACKGROUND OF THE INVENTION

Cultured cheese products are nutritionally dense foods containing 10 to 40% digestible lipid and 3 to 4 kcals/g. They are produced by coagulation of raw or processed milk, concentration of the coagulum solids by mechanical processes to express whey and ageing. During ageing complex microbiological and enzymatic development occur to generate flavor and textural characteristics associated with various cheese types. Lipids per se are biochemically considered to be highly reduced substances. Under the anaerobic environment of the ageing process milk lipids do not participate directly as substrates for metabolic events leading to generation of flavor and aroma qualities of the resulting cheese. However, lipids do have an important impact on the partitioning and capture of volatile flavor and aroma components. Lipids further have impact on the textural properties as well as meltability of the resulting cheese product. Therefore in addition to their nutritional contribution, lipids play an important role in the flavor development, organoleptic characteristics and heat responsiveness of cultured cheese products.

The development of reduced calorie cheese products has evolved around lipid replacement strategies based on blending of low fat or fat-free, skim milk cheese with fat substitutes or fat mimetics to enhance organoleptic quality of the skim milk cheese base. These products are designated processed cheeses. Imitation cheeses are blended variations based on partial or total replacement of milk derived protein with alternative protein sources such as those derived from vegetable sources. Natural cheese products are distinguished from blended products in that the isolation and ageing of the coagulum is conducted in situ without adulteration by subsequent blending of other materials.

The very nature of the cheese making process does not lend itself to extraction of lipid from the intermediate or final products of the process. Rather fractionation of the raw material to remove or reduce lipid at the onset is the protocol of commercial interest today. Low fat processed milk products are readily available as starting raw materials for cultured and other processed dairy products. However, cultured cheese products prepared from skim or substantially reduced-fat milk suffer severe deficiencies due to loss of a key organoleptic component which is lipid. The resulting products are inferior in texture, flavor and appearance and have poor meltability. In part these deficiencies are due to enrichment of natural non-lipid composition with attendant enhancement of their specific functionality, but also due to the loss of unique lipid functionality. The result is an imbalance of physical and organoleptic properties associated with the consumer's expectation for performance of a specific cheese product. Therefore a means has long been sought to reduce the caloric content of cultured cheese products yet maintain high organoleptic standards.

In the past two decades interest in fat substitutes has spawned a host of technological developments in alternative materials for replacement of natural lipids in foods; see for example "Fat Mimetics in Low Fat Cheddar Cheese", J. Food Science, 61 (5) 1267–1270, 1288 (1996). Water and combinations of hydrocolloidal materials, hydrated microparticulated materials based on starch or proteins and synthetic lipids have been reported. All of the above ingredients have been considered as components in low fat or no fat processed cheese products. Specifically, incorporation of structured polyol polyesters such as sucrose polyesters, SPEs, have been reported as highly efficacious, nutritionally unavailable additives for processed cheeses (U.S. Pat. No. 5,585,132).

Insofar as is know, direct substitution of synthetic or organically structured lipids for natural milk lipids prior to coagulation has heretofore not been considered. Such materials are of sufficiently different specific gravity and display such high interfacial tension in milk based fluids that their colloidal dispersions are not stable. This behavior leads to heterogeneous accumulation and phase separation. Therefore, some means of stabilizing the colloidal dispersed lipid state is required. Stabilization components are characterized by the property that they alone or in combination with other components of the system of interest form structured networks throughout the continuous phase. An important aspect of such stabilization is that the physically compartmentalized microdomains are dimensionally similar in size to that of the colloidal material to be physically constrained. Such compartmentalization provides a barrier to translational migration which leads to heterogeneous accumulation and ultimately consolidation of the dispersed lipid domains. Such stabilizer systems may be soluble, interactive polymeric materials which form polymer gels or particulate reticulated material of supracolloidal dimensions which becomes physically entangled to form particle gels. Hybrid combinations of particulate and polymer gel forming components specifically are particularly useful stabilizers in this application.

While known polymer stabilizer systems, for example xanthan gum or quar gum, could be expected to provide maintenance to some degree of a dispersed exogenous colloidal lipid material in a milk matrix, the very mechanism that leads to such phenomena usually prevents effective water removal from the flocculated curd or milk coagulum. This complication is a result of enhanced water immobilization within the capillary and interstitial domains of the dispersed system, a consequence of translational compartmentalization by polymer gels. However, it has now been found that various forms of structurally expanded celluloses can form the basis of a highly effective stabilizer system for synthetic or chemically modified lipids in either natural or reconstituted low/no fat milk bases. Further, these materials allow excellent control of drainage and water removal from the curd enhancing processability. The use of structurally expanded celluloses in the art of cheese making is believed to be new and unique.

SUMMARY OF THE INVENTION

In practicing the method of the invention a nutritionally-diminished, lipid-like substance, such as sucrose polyester (SPE), is dispersed into low fat, skim or no fat milk by means of vigorous agitation. Next, a stabilizing agent, comprising structurally expanded cellulose, prepared as described below, and other optional hydrocolloids and surfactants, is added to the milk containing the dispersed lipid-like substance to provide a milk base. It should be understood, however, that the order of addition of the above-mentioned ingredients is not essential to the successful practice of the invention. The resulting milk base may then be pasteurized prior to homogenization, or undergo direct homogenization. Homogenization may be achieved by high pressure impact discharge (Gaulin Homogenizer) or opposing, submersed jet discharge (Microfluidics Homogenizer). Other preferred methods of homogenization to produce colloidal forms of the lipid-like substance from the dispersed state may be achieved by high shear rotor-stator homogenization or colloid mill type disperators. The colloidal dispersion of the lipid-like substance in the milk base is then inoculated by the appropriate cheese specific microorganism(s) to initiate curd coagulation and subsequent ageing development. A variation may involve enzymatic addition for both curd coagulation and subsequent flavor development, such as proteases and lipases, which may be added along with the inoculum. The resulting curd is cut and drained, salted and finally pressed to individual cheese bricks which are then aged under anerobic conditions for flavor and textural development.

The expression "nutritionally-diminished, lipid-like substance" as used herein, includes both fat replacers, such as SPEs, which provide the organic quality of a lipid but are essentially non-metabolized, and structured lipids, such as glycerol esters with mixed long/short chain fatty acids, which have reduced calorie value upon oxidation as compared to milk fat.

DETAILED DESCRIPTION OF THE INVENTION

In order to appropriately define and distinguish structurally expanded cellulose, SEC, from other forms of cellulose and hydrocolloidal polymers and gums mentioned herein, it is necessary to briefly examine cellulose structure and methods of manipulation. For example, powdered cellulose is known in the art of cheese manufacture as an anticaking agent for ground cheese products. Carboxymethyl cellulose and other cellulose ethers have been considered as useful additives to enhance texture and yield of low fat skim and processed cheese products. Hence differentiation of SEC from other types of "cellulose" known in the art of cheese manufacture is important.

In chemical terms cellulose specifically designates a class of plant derived linear, glucose homopolysaccharides with B 1-4 glycosyl linkage. It is the dominant structural polysaccharide found in plants and hence the most abundant polymer known. The function of cellulose is to provide the structural basis for the supramolecular ensemble forming the primary wall of the plant cell. Differentiation and aggregation at the cellular level are highly correlated with cellulose biosynthesis and assembly. In combination with associated proteins, lignin and heteropolysaccharides such as pectin and hemicelluloses, the cellulosic containing primary cell wall defines the shape and spatial dimensions of the plant cell. Therefore cellulose is intimately involved in tissue and organelle specialization associated with plant derived matter. Over time the term "cellulose substance" or simply "cellulose" has evolved as a common commercial describer for numerous non-vegetative plant derived substances whose only commonality is that they contain large amounts of B 1-4 linked glucan. Commercially, combinations of mechanical, hydrothermal and chemical processing have been employed to enrich or refine the B 1-4 glucan content to various degrees for specific purposes. However, only highly refined celluloses are useful substrates for structural expansion. Examples of highly refined celluloses are those employed as chemical grade pulps derived from wood or cotton linters. Other refined celluloses are paper grade pulps and products used in food. The latter are typically derived from nonwoody plant tissues such as stems, stalks and seed hulls.

Refined cellulose can be considered a supramolecular structure. At the primary level of structure is the B 1-4 glucan chain. All cellulose is similar at this level. Manipulation at this level would by necessity involve chemical modification such as hydrolysis or substitution on the glycosyl moiety. However, as outlined next this level of structure does not exist as an isolated state in other than special solvent systems which are able to compete with extremely favorable intermolecular association energies formed between B 1-4 glucan chains.

In contrast to primary structure, a stable secondary level of structure is formed from the nascent B 1-4 glucan chains which spontaneously assemble into rodlike arrays or threads designated the microfibril. The number of chains involved are believed to vary from 20 to 100. The dimension of the microfibril is under the control of genetic expression and hence cellulose differentiation begins at this level. Pure mechanical manipulation is not normally practiced at this level of organization. However, reversible chemical modification is the basis for commercial production of reconstituted forms of cellulose fibers such as rayon. Chemical substitution by alkylation of the glycosyl moiety yields stable ether substituted B 1-4 glycans which no longer self assemble. This reaction forms the basis for the production of commercial forms of cellulose ethers such as carboxymethyl (CMC), hydroxyethyl (HEC), hydroxypropyl (HPC) and methyl or ethyl (MC & EC) cellulose. One further modification at the secondary structural level involves intensive acid hydrolysis followed by application of high shear to produce colloidal forms of microcrystalline cellulose (MCC). This modification is best deferred to the next level of structure as most forms of MCC are partially degraded microfibril aggregates.

The third level of cellulose structure is that produced by the assemblage of microfibrils into arrays and ribbon like structures to form the primary cell wall. As in the case of secondary structure, tertiary structure is under genetic control but additionally reflects cellular differentiation. It is at this level that other structural polymeric and oligomeric entities such as lignin and proteins are incorporated into the evolving structure. Selective hydrolytic depolymerization and removal of the non-cellulose components combined with application of sufficient shear results in individually dispersed cellular shells consisting of the cellulosic skeletal matrix. With the removal of strong chemically and physically associated polymeric moieties which strengthen the cellulose motif, structural expansion by mechanical translation and translocation of substructural elements of cellulose can begin to occur.

The process by which structural expansion occurs is that of rapid anisotropic application of mechanical shear to a dispersed phase. Particles of refined cellulose, consisting of cellular fragments, individual cells or aggregates of a few cells, are dispersed in a liquid. The continuous liquid phase serves as the energy transduction medium and excess enthalpy reservoir. While the individual forces maintaining secondary and tertiary structure of the refined cellulose particles are largely noncovalent and hence of relatively low energy, the domains of collective ensembles of such interactions possess extraordinary configurational stability due to the large number of interactions. Only by application of intense hydraulic gradients across a few microns and on a time scale that precludes or minimizes relaxation to mere translational capture, can sufficient energy be focused on segments of the refined cell wall to achieve disassembly of tertiary and secondary structure. In practice a small fraction of the applied energy is captured by structural expansion of the dispersed phase. The vast majority of useful energy is lost into enthalpy of the continuous phase and can complicate processing due to high temperature excursions. As disassembly progresses and the structures become smaller and selectively more internally ordered, disassembly rates diminish rapidly and the process becomes self limiting.

Three general processes are known in the art of cellulose manipulation to provide structurally expanded celluloses useful for practice of this invention. The simplest is structural modification from intense shear resulting from high velocity rotating surfaces such as a disk refiner or specialized colloid mill as described in U.S. Pat. No. 5,385,640. A second process is that associated with high impact discharge such as that which occurs in high pressure homogenization devices such as the Gaulin homogenizer described in U.S. Pat. No. 4,374,702. The third process is that of high speed, wet micromilling whereby intense shear is generated at the collision interface between translationally accelerated particles as described in U.S. Pat. No. 4,761,203. It would be expected that anyone skilled in the art could apply one or combinations of the above processes to achieve structurally expanded forms of cellulose useful in the practice of this invention. The complete disclosures of each of U.S. Pat. Nos. 5,385,640, 4,374,702 and 4,761,203 are incorporated by reference in the present specification as if set forth herein in full.

Two other commercial modifications are commonly employed at this structural level and are mentioned to distinguish the resulting product from SECs. The first involves indiscriminate fragmentation by various dry grinding methods to produce powdered celluloses and is widely practiced. Such processes typically result in production of multimicron dimensional particles as intraparticle fragmentation and interparticle fusion rates become competitive in the low micron powder particle size region. Typical powdered celluloses contain particle size distributions ranging from 5 to 500 microns in major dimension and may be highly asymmetric in shape. These products are employed as anticaking or flow improvement additives for ground and comminuted forms of cheese. The second process involves strong acid hydrolysis followed by moderate dispersive shear producing colloidal microcrystalline cellulose (MCC). It is believed that certain less ordered regions comprising tertiary structure are more susceptible to hydrolytic depolymerization than highly ordered domains resulting in shear susceptible fracture planes. Dispersed forms of MCC are needlelike structures roughly three orders of magnitude smaller than powdered celluloses and typically measure about 5 nanometers in width and about 500 nanometers in longitudinal dimension, respectively. On spray drying MCC aggregates to form hard irregular clusters of microcrystals whose particle dimensions range from 1 to 100 microns. The resulting MCC clusters can serve as a precursor for a unique SEC best described as a microscopic "puff ball" reported in U.S. Pat. No. 5,011,701 and is reported to be a fat mimetic. MCC also finds application as a rheology control agent in processed cheese products. The complete disclosure of U.S. Pat. No. 5,011,701 is incorporated by reference in the present specification as if set forth herein in full.

Finally, the quaternary or final structural level of cellulose is that of the cellular aggregate and is mentioned only for completeness. These substances may be highly lignified such as woody tissue or relatively nonlignified such as those derived from the structural stalks and seed hulls of cereal grain plants. Commercial types of these materials are basically dried forms of nonvegetative plant tissue. These moderately elastic substances respond to mechanical processing by deformation and ultimate fracture along the principal deformation vector. Consequently, these materials readily undergo macroscopic and microscopic size reduction and are reduced to flowable powders by conventional cutting, grinding or debridement equipment. Because of the cohesive strength of the molecular ensemble comprising quaternary structure, these materials are not candidates for systematic structural expansion at the submicron level without chemical intervention.

The expression "structural expansion", as used herein refers to a process practiced on refined celluloses involving mechanical manipulation to disassemble secondary and tertiary cellulose structure. The ultimate level of expansion would be to unravel the cell wall into individual microfibrils. Although plant specific, a typical microfibril is best described as a parallel array of 25 to 100 B 1,4 glucan chains with diameter in the 50 nanometer range and variable length ranging from submicron to micron multiples. In practice generation of a dispersed microfibril population is not a realistic objective and only of academic interest. What is usually achieved because of the relatively indiscriminate application of mechanical energy is a highly heterogeneous population of miniature fibrils, ribbon like and slab like structures. These structures display irregular distention of individual microfibrils and aggregates of microfibrils from their surfaces and at internal and external discontinuities. The ensuing collage consists of an entangled and entwined network of cell wall detritus to form a particle gel. Some of the larger structural features with dimensions in the micron range are discernable with the light microscope; however, higher resolution techniques such as scanning transmission electron microscopy are necessary for detailed observation of submicron features. This particle gel network exhibits a vast increase in surface area associated with the volumetric expansion and projection of cell wall structure into the continuous phase medium. Lastly, structurally expanded celluloses useful for purposes of this invention may further be characterized by possessing a water retention value greater than 350 and a settled volume of at least 50% for a 5% w/w dispersion of said SEC in aqueous media.

Two methods for characterizing SEC are useful for purposes of practicing this invention. The first is a simple settled volume test. A powdered or prehydrated SEC is fully dispersed at a specified mass into a specified volume of water. The apparatus usually employed to measure settled volume is the graduated, glass cylinder. The dispersed cellulose phase is allowed to gravity settle to a constant bed volume (usually 24 hr) which to a first approximation reflects the specific dispersed phase volume or degree of structural expansion. SEC useful for practicing this invention is characterized by gravity settled volumes of at least 50% for a 5% w/w aqueous suspension of cellulose. For example a 5% w/w suspension of powdered celluloses characterized as 200 mesh from cottonseed (BVF-200, International Filler Corporation, North Tonawanda, N.Y.), refined wood pulp (BW-200, Fiber Sales & Development Corporation, St. Louis, Mo.) and refined soy hulls (FI-1, Fibred Inc., Cumberland, Md.) yield settled volumes of 31.2%, 23.2% and 22.4%, respectively in 24 hr. These forms of cellulose while potential precursors for SEC are readily distinguished from SEC by this test.

A second method of characterization involves viscometry. SEC begins to form volumetrically sustainable, continuous particle gels at concentrations in the vicinity of 0.5% w/w in the absence of other dispersed substances. This critical concentration may be significantly reduced in the presence of other dispersed colloidal matter. For example fragile gels can be detected in milk at SEC concentrations as low as 0.1% w/w on fluid milk. The onset of formation of the particle gel and the gel strength are characteristic of the type of SEC and the degree of structural expansion. Typically, the particle gels exhibit well behaved, reversible pseudoplastic behavior in the 1% to 3% w/w concentration range. This behavior can be modeled by the power law using a rotational viscometer, such as the Brookfield DVIII, a programmable rheometer (Brookfield Engineering Laboratories, Inc., Stoughton, Mass.). A log/log plot of the shear rate versus shear stress at a specified concentration gives two characteristic system parameters: the flow index and consistency index. The consistency index is reflective of intrinsic gel strength (resting state extrapolation) and the flow index which is indicative of the degree of pseudoplasticity or dynamic particle/particle shear dependent interactivity. SEC's useful for practice of this invention are preferably characterized by displaying pseudoplastic behavior which is modeled by the power law. In the range of 1–2% w/w at 20° C. the preferred SEC's display flow indexes less than unity and typically in the range of 0.2 to 0.7 with the preferred consistency indexes typically ranging from 500 to 10,000 cp.

Preferred nutritionally-diminished, lipid-like substance for use in practicing this invention are sucrose polyesters of long chain fatty acids such as Olestra™, which is described in U.S. Pat. No. 3,600,186 and subsequent related patents. Other useful lipid-like substances include dialkyl, malonates, e.g., dihexadecylmalonate, esterified propylated glycerol and a glycerol or other polyol ester of mixed short/long chain fatty acids.

It is contemplated that certain soluble hydrocolloids may also be useful in the practice of the invention. Dispersive hydrocolloids such as carboxymethylcellulose, CMC, are believed to bind to SECs through interaction of unsubstituted regions on the glucan backbone with the SEC surface, perhaps on the distended microfibril. The presence of carboxymethyl substituents generates anionic polyelectrolyte character to the CMC backbone and hence on its association with SEC imparts a stationary negative charge to the SEC surface. This stationary charge is believed to help control flocculative association of SEC and perhaps colloidal lipid and casein micelles. Other associative hydrocolloids which bind to cellulose such as glucomannans (for example guar) help to control water mobility. Other colloids such as MCC and hydrocolloids such as xanthan and gellan gums are SEC interactive and assist in fine tuning gel structure for the colloidal-network including the dispersed lipid-like substance. Also, colloidal polymeric gums such as xanthan, guar, and arabic and oligosaccharides such as pentosans are excellent steric stabilizers of colloidal dispersions acting at the lipid/water—lipid/protein interface with SEC to reduce interfacial tension and provide insulative barriers to colloidal lipid coalescence.

The following examples are illustrative procedures for practicing this invention by one normally skilled in the art and are not intended to limit its scope.

EXAMPLE 1

A commercially available sucrose polyester (SPE) with a degree of substitution (DS) between 7 & 8, an iodine value of 86.3 and containing five dominant fatty acids with the following triglyceride distribution—palmitic, stearic, oleic, linoleic and behenic as 18.2, 3.6, 31.8, 29.1, and 4.5%, respectively, was used as an example of an unmetabolizable lipid. The above lipid is sterically not accessible as a substrate for human pancreatic lipases and hence not metabolically available due to its inability to be hydrolyzed into constitutive fatty acids which are readily transported across the intestinal mucosa. The lipid is compositionally designed such that it exists largely in beta crystalline form at human body temperature which assists incorporation into fecal solids in the colonic region and hence solid phase expression. Two nonionic surfactants also based on sucrose ester structure but with a much lower DS than the above SPE were obtained from commercial sources—DK-160 with an average DS of 1.23, average molecular weight (AMW) of 659 and a 15 hydrophobic lipophilic balance (HLB) number and DK-50 with a DS of 1.69, an AMW of 777 and a 6 HLB number, and combined as a lipophilic surfactant mixture to assist in the creation of an SPE oil-in-water/milk emulsion.

Two different plant sources of SEC were employed as prehydrated pastes which had been coprocessed with the sodium salt of carboxymethyl cellulose (CMC) as a processing aid (15% w/w on cellulose solids)—6XCS was a cotton seed cellulose derived SEC at 6.6% w/w nonvolatile solids displaying a flow index (FI) of 0.39 and a consistency index (CI) of 5200 cp measured at 1.5% w/w nonvolatile solids and 3XWF was a refined wheat fiber cellulose derived SEC at 5.8% w/w nonvolatile solids with a FI of 0.37 and CI of 4200 cp measured at 1.5% w/w nonvolatile solids. A commercially available pasteurized skim milk was employed which had a nonvolatile solids content of 8.5% w/w. A freeze dried lactic culture R-707 (mesophilic homofermentative O-culture) manufactured by Chr. Hansen Inc., Milwaukee, Wis. was employed as a direct vat set starter culture. CHYM-MAXII, a bacterial derived chymosin preparation at 50,000 MCU/ml, also manufactured by Chr. Hansen, was used as a coagulant. A four experiment set was conducted with the compositions as outlined in TABLE 1.

TABLE 1

|  | EXPT1 | EXPT2 | EXPT3 | EXPT4 |
| --- | --- | --- | --- | --- |
| water | 172.2 g | 172.2 g | 0 | 22.0 g |
| DK-16 | 4.0 | 4.0 | 4.0 | 4.0 |
| DK-50 | 4.0 | 4.0 | 4.0 | 4.0 |
| Na Citrate | 4.0 | 4.0 | 4.0 | 4.0 |
| 6XCS paste | 0 | 0 | 0 | 150.0 |
| 3XWF paste | 0 | 0 | 172.0 | 0 |
| SPE | 0 | 113.6 | 113.6 | 113.6 |
| skim milk | QS all to 4000 g total | | | |

Each test composition contained 0.1% w/w of each surfactant and Na Citrate with variation in SPE (zero or 2.8% w/w) and SEC (zero or 0.25% nonvolatile solids). The individual solutions were prepared as follows. Surfactants, sequesterant, SEC prehydrated paste, and SPE were QS to 1000 g with skim milk at 90° F. The mixture was homogenized for 3 minutes on an rotor/stator dispersator model OMNI-MACRO manufactured by Omni International, Inc., Gainesville, Va. using a 35 mm generator and operating at 6000 rpm. The homogenized mixture was combined with 3000 g skim milk preheated to 90° F. and rehomogenized for an additional 3 minutes on the same assembly at 8000 rpm in a 5 liter plastic beaker. At two minutes into the final homogenization step the starter culture was added. Prior to use in each experiment, 1.5 g of the lyophilized starter culture was dispersed into 100 ml of the preheated skim milk by means of a micro-dispersator model 1000 also manufactured by Omni International, Inc. using a 10 mm generator operating at 10,000 rpm. The make procedure employed was as follows. After homogenization and addition of the starter culture, each container was incubated in a circulated air oven at 90° F. to ripen. After 1 hour 0.7 ml of the coagulant was added, the mixture well stirred and the each beaker allowed to set quiescent at 90° F. After 1 hour the milk mixture had coagulated and the curd mass was cut in situ into ½ inch cubes and allowed to heal for 15 minutes. At that time the cut curd was rapidly cooked by means of a microwave oven to 100° F. and held at that temperature in a circulated air oven at the same temperature. After 1 hour of cooking the whey was drained from the settled curd mass and the curd was cut into ½ inch strips. The strips were returned to the empty vat for cheddering whereby they were incubated for two hours at 100 deg F. during which time the pH dropped to 5.6. At the end of the cheddering step the curds were drained, shredded and salted (2% w/w based on fluid milk used for each experiment). The salted curd was allowed to cure for 30 minutes at 100° F. prior to pressing. Pressing was achieved by means of four parallel, pneumatically driven cylinders with a 2.5 inch diameter cylinder bore driving a 4.5 inch diameter compression disk (delivered pressure ⅓ of drive pressure at the cylinder bore). Each recovered curd mass was weighed and carefully packed into a nylon mesh cloth lined, perforated plastic cylinder with a 40 mesh screen overlaying a removable, latticed base plate for drainage. The nylon mesh cloth was then carefully folded over the packed curd mass and the top press plate positioned. The pressing sequence used was 10 minutes at 10 psi on the bore cylinder chamber. The pressure was relieved and the press cake inverted. The cake was then repressed at 10 psi for 10 minutes. The pressure was again relieved and the cake inverted one more time. The pressure was elevated to 40 psi at the bore cylinder for the final step. The curd cake was pressed at this pressure to approximately constant volume, typically requiring 12–14 hr. However, in this example the final press step was continued 21 hr. It should be pointed out that this technique represents the most conservative curd mass recovery as whey expression proceeds until compressive equilibration occurs whereby only mechanically inaccessible fluids are retained. In commercial practice the extent of mechanical expression of whey from the curd is volumetrically limited as the curd container compression is restricted to a predetermined volume. Commercial cheddar or other hard cheeses made with this invention, therefore, will contain substantially greater amounts of moisture and hence even lower caloric indexes than those reported here where exhaustive expression of whey fluids has been practiced. The results are summarized in TABLE 2.

TABLE 2

|  | EXPT1 | EXPT2 | EXPT3 | EXPT4 |
|---|---|---|---|---|
| (control) | 0% SPE<br>0% | 2.8% SPE<br>0% SEC | 2.8% SPE<br>0.25% CS-SEC | 2.8% SPE<br>0.25% WF-SEC |
| curd wt. | 314.4 g | 505.3 g | 813.8 g | 893.6 g |
| cheese wt. | 254.4 g | 398.3 g | 324.1 g | 289.9 g |

It should be pointed out that large curd yields are obtained for the experiments containing both forms of SEC versus the skim milk control (EXPT1) and the lipid only control (EXPT2). The limiting equilibrium whey expression was designed to emphasize the facile removal of the large amount of entrained fluids within the initial recovered curd if such removal was desired. The recovered cheese cakes were air dried at 65° F. and approximately 50% relative humidity for 48 hr. with top to bottom rotation every 12 hours. The final dried cheeses were wax coated and aged at 40° F. At the time of this report the cheeses were 6 months into the ageing period. At 8 months the cheeses will be organoleptically evaluated and proximate analysis conducted to determine water and lipid retention as well as compute the nutritional index. It is interesting to note that the SEC-containing curds express whey more readily and more extensively than the lipid control (EXPT2). This is expected to have a profound impact on the yield and organoleptic quality for commercial cheese which is not as extensively pressure processed.

EXAMPLE 2

A second form of lipid substitute is that of a structured triglyceride (STG). Here the polyol is glycerol common to all natural triglycerides, but the fatty acid distribution is distributed between short chain fatty acids having less than 6 carbon moieties and very long chain fatty acids having greater than 20 carbon moieties. The short chain fatty acids are metabolically accessible while the very long chain fatty acids are not. Hence the caloric density usually associated with a 16–18 carbon triglyceride at 9 kcal/g is typically reduced to 5 kcal/g for this category of structured lipid. By carefully manipulating the fatty acid chain length and distribution, melting properties can be controlled to mimic saturated fatty acid lipids which are dominantly crystalline at 70° F. or unsaturated fatty acid lipids which are liquid at 70° F. Hence proprietary blends and formulations can be produced which largely reproduce the physical functional properties of the commonly used natural lipid substances, yet are diminished in nutritional function. One commercially available material is known as salatrim and is a proprietary structured triglyceride. The basic formulation employed for this example is outlined in TABLE 3.

TABLE 3

|  | EXPT1 | EXPT2 | EXPT3 | EXPT4 |
|---|---|---|---|---|
| DK160 surfactant | 0.25% | 0.25% | 0.25% | 0.25% |
| 6XCS SEC | 0.0 | 0.10 | 0.10 | 0.10 |
| STG | 0.0 | 0.0 | 2.0 | 2.0 |
| skim milk | QS to 4000 g | | | |

The basic protocol of example 1 was followed for preparation of the emulsion and make procedure. The skim milk was a consumer grade pasteurized product and assayed at 8.6% nonvolatile solids. In contrast to EXAMPLE 1 the third and final stage of pressing at 40 psi was only 12 hours. The results are summarized in TABLE 4.

TABLE 4

|  | EXPT1 | EXPT2 | EXPT3 | EXPT4 |
|---|---|---|---|---|
| (control) | 0.0% STG<br>0.0 SEC | 0.0% STG<br>0.1% SEC | 2.0% STG<br>0.1% SEC | 2.0% STG<br>0.1% SEC |
| curd weight | 322.4 g | 420.4 g | 403.3 g | 502.8 g |
| cheese weight | 244.5 g | 283.8 g | 339.3 g | 323.2 g |

Again a significant dewatering or whey expression associated with the incorporation of SEC is seen when the limiting equilibrium condition for mechanical pressing is applied. These cheese cakes are only one month into the aging process and will be organoleptically and analytically evaluated after 8 months.

Although the present invention has been described and exemplified in terms of certain preferred embodiments, other embodiments will be apparent to those skilled in the art. The invention is, therefore, not limited to the particular embodiments described and exemplified, but is capable of modification or variation without departing from the spirit of the invention, the full scope of which is delineated by the appended claims.

What is claimed is:

1. A method for making a reduced-calorie cheese product, comprising:
   (a) providing a milk base comprising low-fat, skim or no-fat milk, or a mixture thereof, an edible, nutritionally-diminished lipid-like substance and a stabilizing agent comprising structurally expanded cellulose, by the addition of said stabilizing agent to a dispersion of said lipid-like substance in said milk;
   (b) homogenizing said milk base;
   (c) subjecting said homogenized milk base to conditions causing formation of a coagulum;
   (d) concentrating said coagulum; and
   (e) aging the concentrated coagulum.

2. The method of claim 1, wherein said lipid-like substance comprises a fat replacer.

3. The method of claim 1, wherein said lipid-like substance comprises at least one sucrose polyester of long chain fatty acids.

4. The method of claim 1, wherein said lipid-like substance comprises a structured lipid.

5. The method of claim 1, wherein said lipid-like substance comprises at least one polyol ester of short and long chain fatty acids.

6. The method of claim 5, wherein said polyol ester is a glycerol ester.

7. The method of claim 1, wherein said stabilizing agent includes a colloid-forming material.

8. The method of claim 7, wherein said colloid-forming material is selected from the group consisting of carboxymethyl cellulose, a glucomannan, microcrystalline cellulose, xanthan gum, gellan gum, and gum arabic.

9. The method of claim 1, wherein said stabilizing agent includes a surfactant.

* * * * *